United States Patent
Knockeart

[11] 3,813,140
[45] May 28, 1974

[54] ROTATING PRISM SCANNING SYSTEM HAVING RANGE COMPENSATION

[75] Inventor: Ronald P. Knockeart, Walled Lake, Mich.

[73] Assignee: The Bendix Corporation, Southfield, Mich.

[22] Filed: Dec. 13, 1971

[21] Appl. No.: 207,036

[52] U.S. Cl.................... 350/7, 350/285, 178/7.6, 250/216
[51] Int. Cl. .......................................... G02b 17/00
[58] Field of Search ............ 350/6, 7, 285; 178/7.6; 250/216

[56] References Cited
UNITED STATES PATENTS

| | | | |
|---|---|---|---|
| 2,769,922 | 11/1956 | Peery | 350/7 |
| 2,844,648 | 7/1958 | Rosenthal | 350/7 |
| 3,029,685 | 4/1962 | Korneff | 350/285 |
| 3,426,144 | 2/1969 | Roth | 350/7 |
| 3,495,036 | 2/1970 | Clayton | 178/7.6 |
| 3,573,849 | 4/1971 | Herriot | 350/7 |
| 3,594,578 | 7/1971 | Ohman | 350/1 |
| 3,602,572 | 8/1971 | Norris | 350/7 |
| 3,646,568 | 2/1972 | Woywood | 350/7 |

Primary Examiner—Ronald L. Wibert
Assistant Examiner—Michael J. Tokar
Attorney, Agent, or Firm—Lester L. Hallacher

[57] ABSTRACT

A scanning mechanism including a rotating prism and having a relatively flat response irrespective of range variations between the scanning system and the object scanned is described. The inventive system is also free of scanning radiation scatter problems and is easily aligned. These advantages are obtained by utilizing an interference filter in the detection path of the reflected energy and also by detecting reflected energy from a surface of the prism which is different from the transmitting surface.

6 Claims, 9 Drawing Figures

INVENTOR.
RONALD P. KNOCKEART

ROTATING PRISM SCANNING SYSTEM HAVING RANGE COMPENSATION

BACKGROUND OF THE INVENTION

The novel features of the inventive system and the deficiencies of the prior art systems which it overcomes can be best understood by first briefly considering existing scanning mechanisms utilizing a rotating prism. FIG. 1 schematically shows a prior art configuration and is useful in understanding the difficulties and deficiencies of the system. In FIG. 1 a Prism 11 which includes a plurality of flat reflective Surfaces 12 is arranged to rotate about its Axis of Symmetry 13 as indicated by the Arrow 14. A source of Optical Energy 16 such as a laser or high intensity monochromatic light source is situated to direct its output energy to Prism 11 so that the energy is sequentially reflected off the Reflective Surfaces 12 as they enter the energy path because of the prism rotation. The Energy Beam 17 of Laser 16 is directed to Reflective Surfaces 12 through an Aperture 18 contained within a Mirror 19. Energy reflected from Surface 12 is directed to the Object 22 as indicated by Line 21. Object 22 then reflects the energy back to Surface 12 as indicated by Line 23 so that it is reflected from the Surface 12 to Mirror 19 along Line 24. The energy is then reflected along Line 26 to a Detector 27 such as a photomultiplier tube. It should be noted that, at a given instant, energy is transmitted to and received from Container 22 by the same Reflective Surface 12 of Prism 11.

Because of this arrangement the rapid rotation of Prism 11 results in the scanning of Object 22 in the vertical direction. As a consequence, any variation in the reflective capability of Container 11 is effective to modulate the reflected energy. Thus, by appropriately coding the reflective capability of Container 11, such as by the use of a coded label, modulated energy can be detected and decoded to identify Object 22.

The prior art arrangement illustrated with respect to FIG. 1 is more fully described in Defensive Publications U.S. Pat. Nos. 702,459 and 749,337, which were published in the Official Gazette of Apr. 29, 1969. These systems have several significant disadvantages which are overcome by the inventive system. Firstly, because Energy Ray 17 is directed to the Reflective Surfaces 12 of Prism 11 through the Aperture 18 of Mirror 19, alignment of the energy source, the aperture, and the rotating prism is very difficult and is quite critical. This also makes the instrument extremely sensitive to vibration and other extraneous environmental conditions which can be instrumental in causing the instrument to go out of alignment.

Another disadvantage of these systems stems from the fact that the same surface of the prism is instrumental in transmitting energy to the object and also in receiving reflected energy from the object. The Energy Ray 17 which is directed to the prism is scattered when it impacts the surface, and as a consequence some of the incident radiation is scattered back to Mirror 19 and thus directed to Detector 27, thereby creating a noise level which can obscure or otherwise confuse the coded modulation of the reflected energy.

Another significant disadvantage of the prior art system of FIG. 1 stems from the fact that the intensity of the received reflected radiation varies in accordance with the inverse square of the distance between the reflecting Prism 11 and the scanned Object 22. As a consequence, if the distance between Prism 11 and Object 22 is tripled, the energy detected by Detector 27 is decreased by a factor of 9. This renders the system very sensitive to range variations and has resulted in the expensive design of very sophisticated and complex gain control circuits which are intended to alleviate the range sensitivity problem.

SUMMARY OF THE INVENTION

The inventive system overcomes the deficiencies of the prior art systems by taking the reflected energy off a surface of the rotating prism which is different from the surface which is used to reflect the energy to the object. Furthermore, the reflected energy is received from the reflecting surface and then directed to an interference filter so that the energy which is received at angles above a small minimum angle are not transmitted through the filter. The output of the filter is then directed to a detector in much the same manner as the prior art systems; however, because the filter rejects monochromatic radiation which is received at substantial angles, the response of the system no longer varies as the inverse square of the distance but instead remains relatively constant irrespective of variations in distance between the rotating prism and the reflecting object.

Furthermore, because the reflected energy is taken from a surface which is different from the transmitting surface, the alignment problems and scattering problems inherent in the prior art systems are completely eliminated.

When the scanning energy is normal to the surface of the object scanned, the reflected energy is at a maximum (for any given distance between scanner and object), and as the angle increases from the normal the reflected energy decreases. Also, as the prism rotates, the reflective surface area capable of reflecting energy to the detector varies. These factors cause a wide variation in the energy received by the detector. In the inventive system the adverse results of these effects are offset by causing the reflected energy to pass through a reflected energy aperture which permits a maximum of transmission at large scan angles and a minimum of transmission along the normal scan line, thus providing essentially uniform response throughout the scan angle.

DETAILED DESCRIPTION

Figure 2:
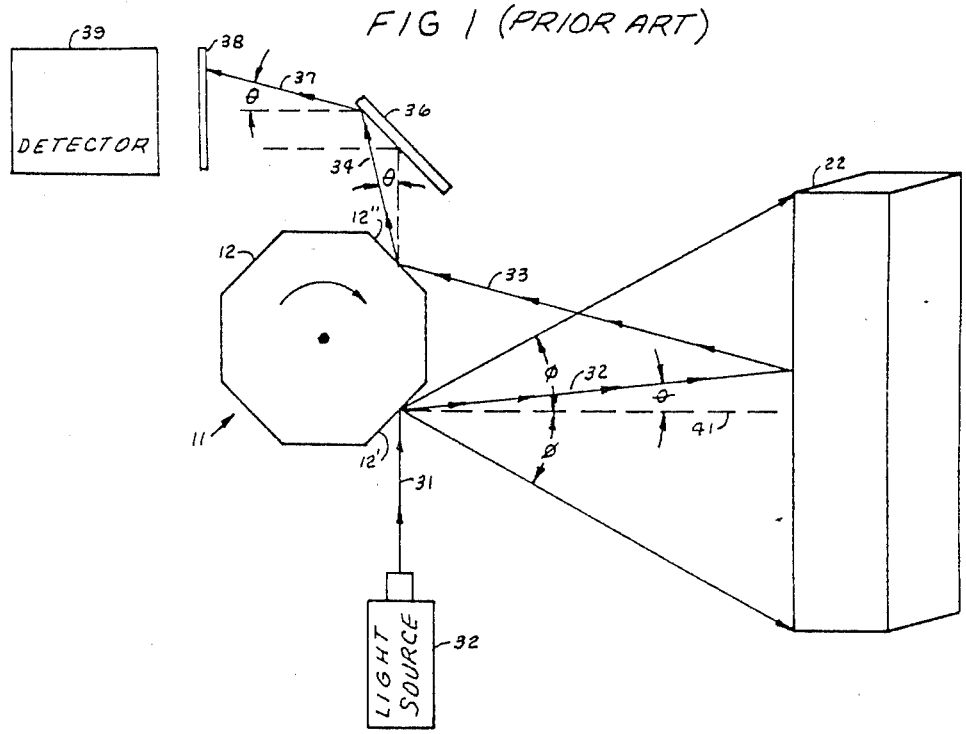
FIG. 2 is a preferred embodiment of the inventive system.

The preferred embodiment of the invention shown in FIG. 2 includes a Prism 11 which is rotated at a constant rate of speed so that the reflective Surfaces 12 are sequentially exposed to Radiation 31 which is emanated from a Light Source 30. Light Source 30 is preferably a laser or some other high intensity monochromatic light source so that the wavelength of the energy emanating from the source falls within a very narrow bandwidth of wavelengths. However, if desired, noncoherent light or acoustic energy can be used. The radiation 31 impacts a Surface 12' of Prism 11 so that it is reflected to the Object 22 in accordance with the angular disposition of the Prism. Accordingly, the rotation of Prism 11 causes the energy to scan the complete vertical dimension of Object 22. Obviously, as one surface leaves the area of reflection the next surface enters this position and in turn reflects the energy to Object 22. Thus, each of the reflective surfaces causes one complete scan of Object 22.

Light leaving Surface 12' travels a path such as 32 to Object 22 and is reflected back by way of a Path 33 to a receiving Surface 12". Light Ray 34 then impacts a Mirror 36 so that a reflected Light Ray 37 falls upon an Interference Filter 38. The light is then transmitted through Filter 38 to a Detector 39. It will be appreciated that, if desired, a minification lens can be placed between Reflecting Mirror 36 and Interference Filter 38. It will also be understood that, if desired, Mirror 36 can be eliminated and Filter 36 positioned to receive energy directly from Surface 12".

Because Prism 11 rotates at a high rate of speed, the angular disposition of Reflected Ray 32 with respect to the Normal 41 varies in accordance with the rotation. The distance the light ray must travel between Object 22 and Prism 11 therefore varies with the prism rotation, because obviously the distance along Normal 41 is less than the distance to the extremeties of Object 22. Furthermore, when the incident light on Object 22 is off Normal 41, the angle of reflection is also off normal so that the reflected light received at the prism is reduced somewhat, depending on the light dispersive characteristics of the Container 22. These two factors cause the intensity of the reflected Energy Ray 33 to vary and be a minimum when $\phi$ is a maximum, and obviously the intensity is greatest in the proximity of Normal 41. Because the intensity of the reflected energy varies with the angle of incidence (scan angle), the energy received by Filter 38 varies in like manner. The intensity variation of the energy received by Detector 39 can thus be considered as being caused by scattering variations and variations in the distance between Prism 11 and Object 22 as a function of scan angle. The rotation of Prism 11 also causes variations in the intensity of energy received by Detector 39 varies as a result of the rotation. This can be understood by referring to FIG. 7.

Figure 7:
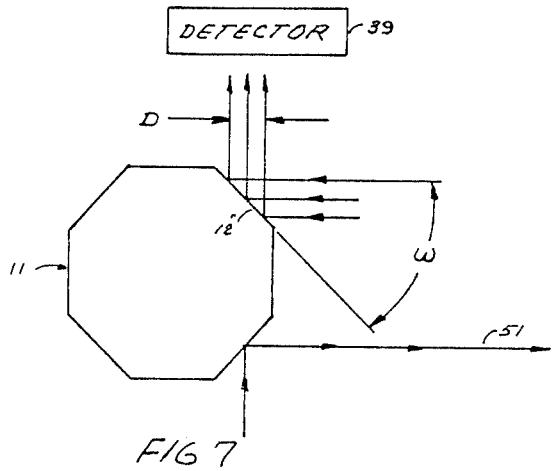
FIG. 7 shows how the intensity of the received energy varies as a function of the angular orientation of the prism.

In FIG. 7 the Transmitted Energy Rays 51 reflect off a target (not shown) which is sufficiently afar to cause the Reflected Energy 52 to be substantially parallel to the transmitted rays. Accordingly, the reflected rays enter Prism 11 at an angle $\omega$. Obviously $\omega$ varies continuously as Prism 11 rotates. The dimension D is the length of the Surface 12" projected in the plane parallel to Detector 39. D is also a measure of the area of scanning surface presented to the Detector 39. For constant mirror thickness T the area varies as $D = PT \cos \omega$.

Hence, the area of the Reflective Surface 12" parallel to Detector 39 is dependent upon angle $\omega$. The intensity of energy received by Detector 39 therefore varies in accordance with the expression:

$$F = IA \cos \omega$$

where:
F = Total flux received by Detector 39
I = Intensity received by Surface 12"
A = Area parallel to Detector 39

Hence, the total energy available at Detector 39 decreases as angle $\omega$ increases.

Rotation of Prism 11 is now seen to cause variations in received energy intensity for two reasons: (1) the angle of incidence $\phi$ changes, and (2) the reflective area exposed to Detector 39 changes. These effects are separate but are somewhat related because when $\omega$ is such that it causes the intensity to be a minimum $\phi$ also causes intensity to be a minimum. However, it should be noted that when the beam is at the top of Container 22 $\phi$ causes minimum intensity but $\omega$ causes maximum. Because $\phi$ and $\omega$ vary simultaneously, they can be offset simultaneously. One solution is the insertion of a reflected energy attenuator between Object 22 and Prism 11.

Figure 6:
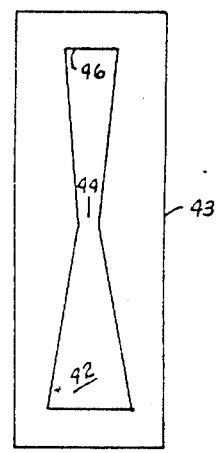
FIG. 6 shows an aperture which is configured to cause a relatively linear response as a function of the angle of reflected energy.
Figure 8:
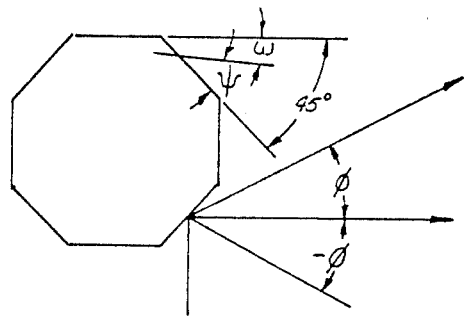
FIG. 8 shows the relationship between the scan angle $\phi$ and the prism rotating angle $\omega$.

Such an aperture is shown in FIG. 6. The Aperture 47 is contained in an Opaque Member 43 and includes a Narrow Portion 44 and two wider End Portions 42 and 46. Aperture 47 is configured to vary in accordance with the Scan Angle $\phi$ and Prism Angle $\omega$. These angles are related as shown in FIG. 8 by the expression:

$$\omega = 45° - \psi$$
$$\phi = 2\psi$$
$$\therefore \omega = 45° - (\phi/2)$$

or $$2\omega + \phi = 90°$$

The effect is $\omega$ is therefore double that of $\phi$ and $\phi$ is a much smaller angle than $\omega$. Aperture 47 is configured to permit a relatively constant transmission of energy for all values of $\omega$ and $\phi$. This is done by placing Restriction 44 closer to End 46 than End 42. This is the condition where $\phi$ causes minimum intensity and $\omega$ causes maximum. Hence, the dimension at 42 is only slightly larger than Restriction 44. However, at the bottom, where $\phi$ and $\omega$ both cause minimum intensity, the dimension at 42 is much larger than Restriction 44. Accordingly, the placement of an Element 43 in the scan path such that Restriction 44 is along Normal 41 substantially offsets intensity variations caused by changes in the angle $\phi$ and $\omega$. It will be appreciated that the sides of Aperture 47 would preferably be nonlinear, but a valid approximation can be obtained using straight sides as shown in FIG. 6.

The above discussion reveals how the scanning systems is made insensitive to intensity variations caused by changes in the angles $\phi$ and $\omega$. However, as pointed out hereinabove, the greatest intensity variations are caused by changes in the distance D between Prism 11 and Object 22. Some small changes in distance D occur as scan angle $\phi$ changes. However, much more significant changes can occur when a series of objects are sequentially scanned as they move along a conveyor. Because intensity varies with the inverse square of distance, this factor is the most significant. One manner of compensating for distance changes includes the selection of Filter 38 and the dimension L of Prism 11.

Figure 3:
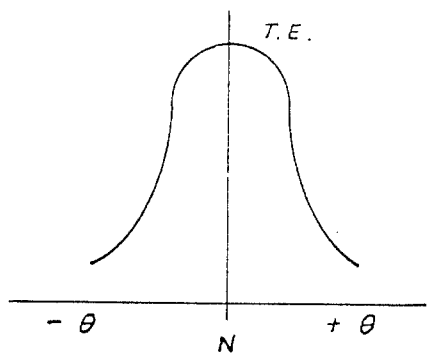
FIG. 3 shows the transmission efficiency curve of an interference filter as a function of the angle of incident energy (at constant wavelength).

The importance of Filter 38 can be understood by referring to FIG. 3, which shows the transmission efficiency (TE) of a typical interference filter as a function of angle or radiation incidence $\theta$. The transmission efficiency (TE) is shown to drop off sharply as the angle $\theta$ from the normal (N) to the filter increases. At a particular incident angle $\theta_c$, the transmission efficiency is decreased to a point where very little if any useful signal passes through the filter. As will be explained hereinafter, the angle of incidence $\theta$ is a function of distance D and hence distance compensation can be achieved by selecting Filter 38.

Figure 4:
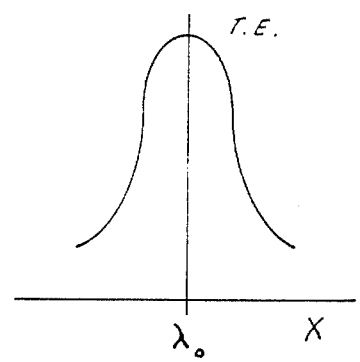
FIG. 4 shows the transmission efficiency curve of an interference filter as a function of the wavelength of incident energy (at constant incidence angle).
Figure 9:
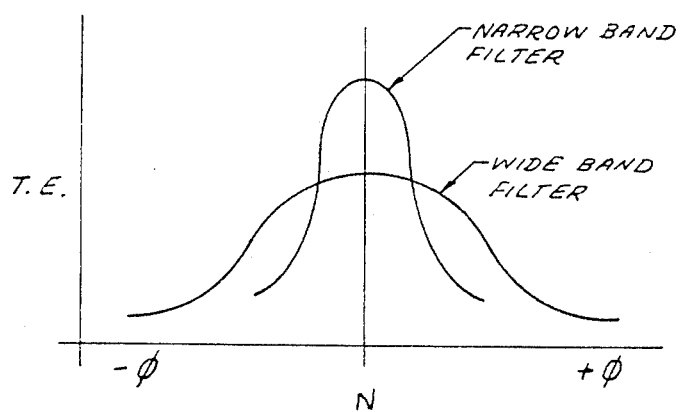
FIG. 9 shows how transmission efficiency of interference filters varies with bandwidth and angle of incidence.

The selection of Filter 38 is explained with reference to FIG. 4, which shows that the transmission efficiency varies with the wavelength $\lambda$ of the incident light. Also, FIG. 9 shows that transmission efficiency varies with angle of incidence $\theta$ and with bandwidth $\Delta\lambda$. These characteristics can be expressed as follows:

$$\lambda_s = \sqrt{1 - [(\sin\theta)^2/n^2]}$$

thus, $\lambda_s$ can be generally expressed as a function of $\theta$, i.e., $\lambda_s$ can generally be expressed as a power series of the form $\lambda_s = c_0 + C_1(\theta - a) + C_2(\theta - a)^2 + C_3(\theta - a)^3 + \ldots C_n(x - a)^n$ or $\lambda_s = f(\theta^n)$ and T.E. $= f(\lambda_s, B.W.)$, where B.W. is the bandwidth $\Delta\lambda$ in FIG. 4. Accordingly, T.E. is a function of $\theta$, i.e., $$T.E. = f(\theta^n, B.W.)$$

(1)

As stated hereinabove, intensity variation is expressed by $I = K/D^2$ and hence the above expressions show that, if the angle of incidence $\theta$ can be related to the distance D, the filter can be selected to compensate for the inverse square alteration.

Figure 5:
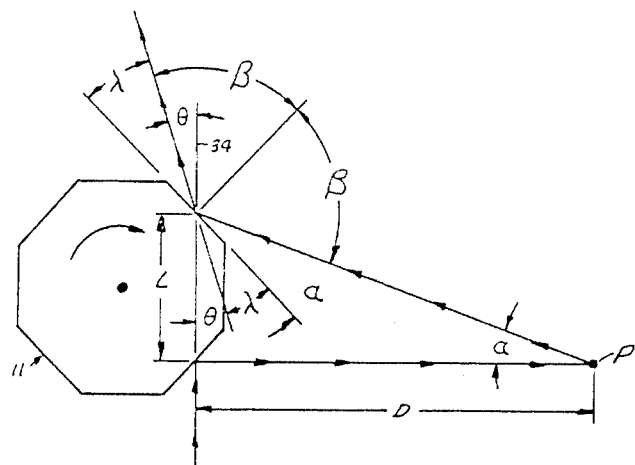
FIG. 5 is a diagram useful in showing the dependence of the angle of energy incidence as a function distance between the prism and the container.

The angle of incidence of the reflected energy on Mirror 36 is dependent upon the distance D between Prism 11 and Object 22. This angle variation causes a variation in the energy received by Detector 39 because Filter 38 passes only energy incident within a particular angular range. The dependence of the incident angle $\theta$ upon distance can be understood by viewing FIG. 5. In FIGS. 5, L is the distance between the midpoints of alternate surfaces of Prism 11, D is the distance from one of these midpoints to a point P where the energy impacts the Object 22. Because Prism 11 has eight sides, the reflective surfaces are disposed at 45° angles, hence the following relationships can be written:

$\beta + \gamma = 90 = \beta + \tau$ $\therefore \gamma = \tau$ $\theta + \tau = 45°$ $\therefore \theta = 45° - \tau$ $\gamma + 45 = 90 - \alpha$ $\tau + 45 = 90 - \alpha$ $\tau = 45 - \alpha$ $\theta = 45° - [45 - \alpha]$ $$\theta = \alpha = \arctan L/D$$

(2)

Equation 2 therefore shows that the angle at which energy impacts Filter 38 is dependent upon the ratio of L/D. However, L is a fixed value for a given system, and therefore the variation is dependent solely upon changes in distance D. It should be noted that the above relationships are independent of any outside parameters and, accordingly, hold true for all orientations of Prism 11. Therefore, rotation of Prism 11 causes Point P to move without disturbing the above relationships.

Equation 2 relates incident angle $\theta$ and distance D, and hence can be written as:

$$D = L/\tan\theta = Lf(\theta^p)$$

(3)

In like manner the intensity expression can be rewritten as $$I = K/D^2 = K_1/f(\theta^m)$$

(4)

By properly selecting the filter, the effects of $\theta$, and hence D, can be substantially offset. Intensity at the Detector $I_F$ can thus be expressed as the incident intensity at the filter input modified by the filter characteristics $$I_F = [K_1/f(\theta^m)] f(\theta^n, B.W.)$$

(5)

Expression (5) can be expanded with a power series in $\theta$. By careful selection of filter and scanner characteristics and utilizing the curves of FIGS. 3, 4, 9, and 10, the significant terms in $\theta$, over the range of interest, can be made to cancel leaving $I_F$ independent of $\theta$ and hence distance. Of course, the compensation is approximate and holds only over the range designed for. The power series expansion is within the purview of those skilled in the art.

Figure 1:
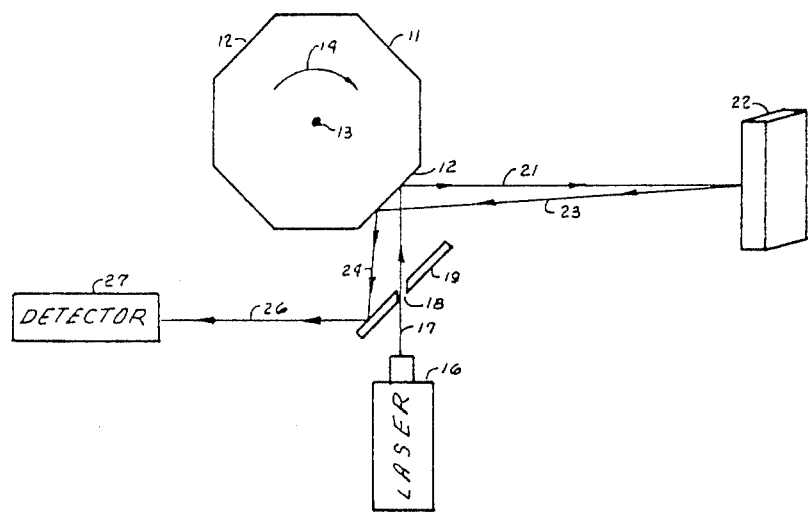
FIG. 1 shows a prior art optical scanning system.

It will be appreciated that, because reflected energy is received by Detector 39 from a Surface 12″ which is different from the Transmitting Surface 12′, the problems of aligning Aperture 18 of Mirror 19 with Prism 12 and Detector 27 of the prior art configuration shown in FIG. 1 is eliminated. Furthermore, the back scatter problem described hereinabove with respect to the prior art configuration of FIG. 1 is also eliminated by taking the reflected energy off a reflective surface which is different from the transmitting surface.

What is claimed is:

1. A system for scanning an object with radiation and for detecting radiation reflected from said object comprising:

a reflective element mounted for rotation in said system and having a plurality of surfaces for transmitting radiation to said object and receiving reflected radiation from said object, said surfaces sequentially passing a first and a second preselected spatial location within said system as said element rotates in said system, said locations lying in the rotational path of said reflective element and being spaced so that different surfaces of said element simultaneously coincide with said first and second locations whereby one of said surfaces transmits radiation to said object and another of surfaces simultaneously receives radiation reflected from said object and all of said plurality of surfaces alternately serves as a receiving surface and a transmitting surface;

means for directing said radiation to said first spatial location so that said object is scanned with said radiation as said surfaces sequentially pass said first location and thereby transmit said radiation to said object;

means for detecting reflected radiation in the proximity of said second location so that radiation reflected from said object to said second location is received by said means for detecting as said surfaces sequentially pass said second location.

2. The system of claim 1 wherein said means for detecting includes an interference filter for passing only radiation received within a selected range of angles of incidence.

3. The system of claim 2 wherein said means for directing radiation includes a laser; and further including mirror means interposed said filter and said reflective element.

4. The system of claim 1 further including an opaque member interposed said reflective element and said object, said opaque member including an aperture configured to minimize transmission of reflected radiation along the normal between said object and said reflective member and increase transmission of reflected radiation proportionately with the angle of reflection between said object and said reflective element and the angular rotation orientation of said prism.

5. The system of claim 4 wherein said means for detecting includes an interference filter for passing only radiation received within a selected range of angles of incidence.

6. The system of claim 4 wherein said aperture is configured with a narrow section and two wider sections which converge away from said narrow section, said converging sections being dimensioned to maximize transmission of reflected radiation at the extremeties of said aperture.

* * * * *